UNITED STATES PATENT OFFICE.

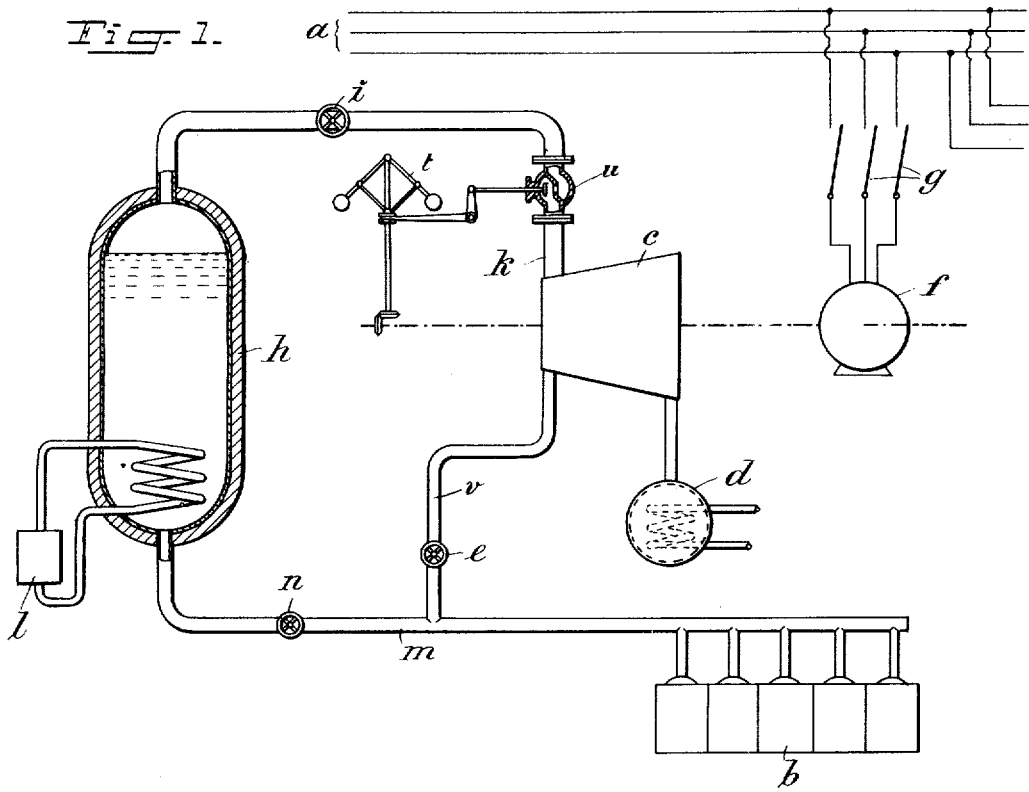
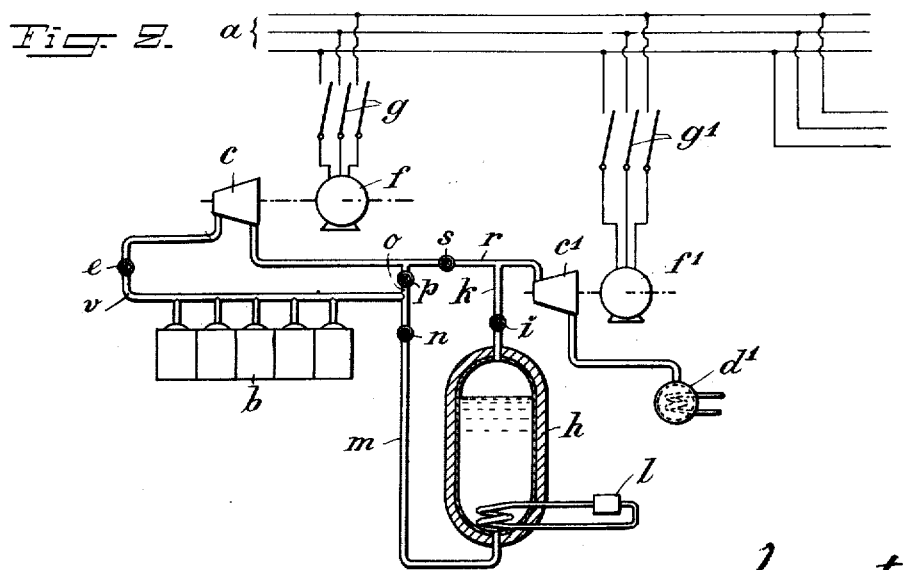

JOHANNES CARL RUTHS, OF STOCKHOLM, SWEDEN.

ELECTRIC POWER PLANT.

1,368,576. Specification of Letters Patent. Patented Feb. 15, 1921.

Application filed August 5, 1916. Serial No. 113,395.

*To all whom it may concern:*

Be it known that I, JOHANNES CARL RUTHS, graduated engineer, a subject of the King of Sweden, residing at Stockholm, Sweden, have invented certain new and useful Improvements in Electric Power Plants; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In electric power plants having steam reserve it has been found a great inconvenience that the boiler battery of the steam reserve must always be kept ready to instantly take over the total load in case of disturbances. This inconvenience is especially felt in water power operated plants where the energy is supplied through long mains to electric stations in or near the towns, which stations are provided with steam reserve plants. Even if at such stations electric energy is produced by steam-engines, in which case the water power and steam plants work parallel, the above named inconvenience is met with as the steam-engines in the central steam plant in case of disturbances are not able to take up the total load. A steam reserve boiler plant must also in this case always be kept ready.

Now my invention has for its purpose to solve this problem in an economical way, so that the boiler reserve need not always be kept ready for use.

According to my invention one connects with the steam reserve a reservoir suitably insulated, that contains water under pressure and of a temperature corresponding thereto. From this reservoir steam is supplied to the steam-engines should a disturbance take place. The capacity of this reservoir is so calculated that in case of small disturbances steam can be taken only from the reservoir while in case of greater disturbances steam is taken from the reservoir only until the reserve boiler battery is ready to be used. The water in the reservoir may be heated to the temperature required either by means of steam from the boiler battery, or by means of electric current, or in some other practical manner. In order to take care of the losses by radiation the reservoir may be provided with a small heating apparatus.

It is quite evident that with this arrangement a means is provided, by which in a very economical way the permanent readiness of the reserve boiler plant may be insured. The cost for compensating the losses by radiation is exceedingly small. The efficiency is high.

The invention may be carried out in many ways. On the drawing are shown in Figures 1 and 2 different embodiments of my invention diagrammatically.

In Fig. 1 $a$ indicates the three electric main lines from a power station, for example a water power station. $b$ is the reserve boiler battery, $c$ the reserve engine (*e. g.*, turbine), $d$ a condenser, $e$ a valve and $f$ an alternating current generator, that by means of the switch $g$ may be connected with the lines $a$.

Hitherto the boiler reserve $b$ had to be continually kept ready for use, so that the generator $f$ in case of disturbances at the main electric station or in the main lines $a$ could be instantly started for the purpose of supplying the network of lines. According to my invention, an insulated reservoir $h$, containing water under pressure and of a corresponding temperature, is arranged in such a manner in the plant that the steam-engine $c$ in case of a disturbance or interruption temporarily may be operated with steam from this reservoir $h$. The capacity of the reservoir $h$ is preferably so calculated that during a small disturbance the total amount of steam required will be supplied from the reservoir $h$, while in case of a greater disturbance requiring the use of the spare boiler, the steam supply will be continued from the reservoir $h$ so long until the spare boiler has been sufficiently heated to supply the steam required.

In case of a disturbance at the principal power station or in the mains $a$ or in case the energy supply is entirely cut off, the valve $i$ is opened either automatically or by hand, so that steam can flow from the reservoir $h$ to the engine $c$. The generator $f$ then takes over the entire supply of electrical energy, the network of lines being fed by the generator. If the disturbance is of short duration only, it will of course not be necessary to heat the boiler $b$, but if the disturbance is of a longer duration the boiler battery $b$ is heated. As soon as the required amount of steam can be taken from the boilers $b$, the valve $i$ is shut and the valve $e$ opened, whereupon the engine $c$ is driven only with steam from the boiler reserve $b$. While in the drawing the pipe $v$ is shown as leading directly to the turbine $c$, said pipe will preferably be arranged to connect with the pipe $k$ in advance of the valve $u$ of the centrifugal governor $t$.

In order to compensate the losses by radiation from the reservoir $h$, a small heating apparatus $l$ is arranged, that maintains the water in the reservoir $h$ at such a temperature as corresponds to the pressure in the reservoir. The said heating apparatus will naturally be so dimensioned that after a short drawing off of steam from the reservoir $h$ the pressure therein will be restored by means of said apparatus.

If the disturbance is of so long a duration that the boiler reserve must be used, then the reservoir $h$ is preferably charged with steam from the boilers $b$. For this purpose a steam pipe $m$ provided with a shut-off member $n$ is arranged between the boiler battery $b$ and the reservoir $h$.

It is evident that the reservoir $h$ also may be used for supplying an occasional lack of power during the regular operation. If in this case, steam is drawn off in comparatively big quantities at various times from the reservoir $h$ one can charge the reservoir $h$ from one of the boilers in the boiler reserve if the heating apparatus $l$ is not sufficient.

According to Fig. 2 two steam engines $c$ and $c^1$, shown as steam-turbines, are provided. As in Fig. 1 a steam pipe $v$ with a valve $e$ therein leads from the boiler battery $b$ to the high-pressure turbine, while a second pipe $m$ provided with the valve $n$ is connected to a branch-pipe $o$ in which a valve $p$ is inserted. This latter pipe opens into pipe $r$ provided with the valve $s$ and leading to the low pressure turbine $c^1$, which latter is connected with the condenser $d^1$. $f^1$ indicates a generator driven from the turbine $c^1$, and $g^1$ is the corresponding switch.

In this embodiment $c^1$ may first be supplied with steam from the reservoir $h$ in case of a disturbance, in which case the generator $f^1$ supplies the lines $a$ over $g^1$. As soon as the boiler battery $b$ is ready for use, $c$ is started by the opening of the valve $e$, while simultaneously $i$ is shut and $s$ opened so that $c^1$ will be driven by exhaust steam from the high-pressure turbine $c$. Through the pipe $m$ the reservoir $h$ may be charged with steam from the boiler battery $b$. Or, when the valve $s$ is shut, the exhaust steam can be led from $c$ through the pipes $o$ and $a$ into the reservoir $h$. Moreover, the low pressure turbine $c^1$ may be supplied with steam directly from the boiler battery $b$.

Also in this modification an occasional lack of power may be taken care of during the regular operation by the generator $c^1$, which then is driven with steam from the reservoir $h$. The charging of the reservoir may be effected in the same manner as in Fig. 1.

It is evident that the two turbines $c$ and $c^1$ may be either incorporated in a two-stage turbine or may be arranged on the same shaft, in which case only one generator $f$ is necessary.

Claims:

1. In a reserve boiler plant for electric power stations in combination with a steam reserve boiler, being normally unheated, a steam engine, an electric generator driven by said engine and an insulated heat-storing reservoir, containing a liquid of a temperature above the boiling point, a steam conduit connecting the steam space of the said boiler with the steam engine, a second steam conduit connecting the steam space of the said reservoir with the steam engine, and valves in the said conduits, the arrangement being such as to permit independent use of either the boiler or the reservoir.

2. In a reserve boiler plant for electric power stations in combination with a steam reserve boiler, being normally unheated, an electric generator driven by said engine and an insulated heat-storing reservoir, containing a liquid of a temperature above the boiling point, a steam conduit between the steam space of the said boiler and the water space of the said reservoir, a second steam conduit connecting the steam space of the said boiler with the said steam engine, a third steam conduit connecting the steam space of the reservoir with the steam engine, and valves in the said conduits, the arrangement being such as to permit independent use of either the boiler or the reservoir.

In testimony that I claim the foregoing as my invention, I have signed my name in presence of two subscribing witnesses.

JOHANNES CARL RUTHS.

Witnesses:
PAULA PIRCHER,
M. BERGMEISTER.